(12) United States Patent
Newnam et al.

(10) Patent No.: US 8,555,313 B2
(45) Date of Patent: Oct. 8, 2013

(54) SYSTEM AND METHOD FOR COORDINATING INTERACTIVE TELEVISION PROGRAMS

(75) Inventors: Scott G. Newnam, Manhattan Beach, CA (US); Izet Fraanje, Santa Monica, CA (US); Douglas T. Neumann, Los Angeles, CA (US)

(73) Assignee: Ericsson Television Inc., Duluth, GA (US)

( * ) Notice: Subject to any disclaimer, the term of this patent is extended or adjusted under 35 U.S.C. 154(b) by 2915 days.

(21) Appl. No.: 10/142,756

(22) Filed: May 9, 2002

(65) Prior Publication Data

US 2003/0189668 A1    Oct. 9, 2003

Related U.S. Application Data

(60) Provisional application No. 60/370,993, filed on Apr. 9, 2002.

(51) Int. Cl.
*G06F 13/00* (2006.01)

(52) U.S. Cl.
USPC .................. 725/40; 725/32; 725/51

(58) Field of Classification Search
USPC .................................. 725/51, 112
See application file for complete search history.

(56) References Cited

U.S. PATENT DOCUMENTS

| | | | |
|---|---|---|---|
| 5,488,409 A | 1/1996 | Yuen et al. | |
| 5,517,257 A | 5/1996 | Dunn et al. | |
| 5,537,141 A | 7/1996 | Harper et al. | |
| 5,539,822 A * | 7/1996 | Lett | 380/211 |
| 5,539,892 A | 7/1996 | Reininger et al. | |
| 5,581,803 A | 12/1996 | Grube et al. | |
| 5,589,892 A | 12/1996 | Knee et al. | 348/731 |
| 5,638,113 A | 6/1997 | Lappington et al. | |
| 5,695,400 A | 12/1997 | Fennell, Jr. et al. | |
| 5,724,521 A | 3/1998 | Dedrick | |
| 5,734,413 A | 3/1998 | Lappington et al. | |
| 5,774,664 A | 6/1998 | Hidary et al. | 395/200.48 |
| 5,778,181 A | 7/1998 | Hidary et al. | 395/200.48 |
| 5,848,352 A | 12/1998 | Dougherty et al. | |
| 5,903,262 A | 5/1999 | Ichihashi et al. | |
| 5,930,765 A | 7/1999 | Martin | |
| 5,987,525 A | 11/1999 | Roberts et al. | |
| 6,006,256 A | 12/1999 | Zdepski | 709/217 |
| 6,007,426 A | 12/1999 | Kelly et al. | |
| 6,018,768 A | 1/2000 | Ullman et al. | 709/218 |

(Continued)

FOREIGN PATENT DOCUMENTS

| | | |
|---|---|---|
| EP | 1 187 485 A1 | 3/2002 |
| WO | WO 97/34419 | 9/1997 |

(Continued)

OTHER PUBLICATIONS

ABC Sports, "ABC Sports to Launch Enhanced TV Programming During Jan. 4 Tostitos Fiesta Bowl College Football National Championship Game" *Press Release* (1998).

(Continued)

*Primary Examiner* — Pankaj Kumar
*Assistant Examiner* — Timothy Newlin

(57) ABSTRACT

A synchronization system and method coordinates the provision of interactive content provided in a broadcast signal and independently of a broadcast signal.

7 Claims, 7 Drawing Sheets

(56) References Cited

U.S. PATENT DOCUMENTS

| | | | |
|---|---|---|---|
| 6,026,366 A | 2/2000 | Grube | |
| 6,061,719 A * | 5/2000 | Bendinelli et al. | 709/218 |
| 6,075,551 A | 6/2000 | Berezowski et al. | |
| 6,161,137 A | 12/2000 | Ogdon et al. | |
| 6,173,332 B1 | 1/2001 | Hickman | |
| 6,193,606 B1 | 2/2001 | Walker et al. | |
| 6,215,526 B1 | 4/2001 | Barton et al. | 348/473 |
| 6,233,389 B1 | 5/2001 | Barton et al. | 386/46 |
| 6,239,793 B1 | 5/2001 | Barnert et al. | |
| 6,240,555 B1 | 5/2001 | Shoff et al. | |
| 6,263,505 B1 | 7/2001 | Walker et al. | |
| 6,331,144 B1 | 12/2001 | Walker et al. | |
| 6,414,635 B1 | 7/2002 | Stewart et al. | |
| 6,421,706 B1 | 7/2002 | McNeill et al. | |
| 6,426,778 B1 | 7/2002 | Valdez, Jr. | |
| 6,460,180 B1 | 10/2002 | Park et al. | |
| 6,573,907 B1 | 6/2003 | Madrane | |
| 6,577,324 B1 | 6/2003 | Palmer et al. | |
| 6,637,032 B1 | 10/2003 | Feinleib | |
| 6,675,387 B1 | 1/2004 | Boucher et al. | |
| 6,684,257 B1 | 1/2004 | Camut et al. | |
| 6,699,127 B1 | 3/2004 | Lobb et al. | |
| 6,718,551 B1 | 4/2004 | Swix et al. | |
| 6,728,753 B1 | 4/2004 | Parasnis et al. | |
| 6,766,524 B1 | 7/2004 | Matheny et al. | |
| 6,799,327 B1 | 9/2004 | Reynolds et al. | |
| 7,024,677 B1 | 4/2006 | Snyder et al. | |
| 7,028,327 B1 * | 4/2006 | Dougherty et al. | 725/93 |
| 7,222,155 B1 | 5/2007 | Gebhardt et al. | |
| 2001/0001160 A1 | 5/2001 | Shoff et al. | 725/51 |
| 2001/0032132 A1 | 10/2001 | Moran | |
| 2002/0023230 A1 | 2/2002 | Bolnick et al. | |
| 2002/0054244 A1 | 5/2002 | Holtz et al. | |
| 2002/0054750 A1 | 5/2002 | Ficco et al. | |
| 2002/0065927 A1 | 5/2002 | Janik et al. | |
| 2002/0100039 A1 | 7/2002 | Iatropoulos et al. | |
| 2002/0103696 A1 | 8/2002 | Huang et al. | |
| 2002/0122060 A1 | 9/2002 | Markel | |
| 2002/0124249 A1 | 9/2002 | Shintani et al. | |
| 2002/0129381 A1 | 9/2002 | Barone, Jr. et al. | |
| 2002/0133562 A1 | 9/2002 | Newnam et al. | |
| 2002/0141734 A1 | 10/2002 | Murata et al. | |
| 2002/0143901 A1 | 10/2002 | Lupo et al. | |
| 2002/0162117 A1 | 10/2002 | Pearson et al. | |
| 2002/0184623 A1 | 12/2002 | Hodge et al. | |
| 2004/0216161 A1 | 10/2004 | Barone et al. | |
| 2004/0216171 A1 | 10/2004 | Barone et al. | |
| 2005/0015796 A1 | 1/2005 | Bruckner et al. | |
| 2007/0130581 A1 | 6/2007 | Del Sesto et al. | |

FOREIGN PATENT DOCUMENTS

| | | |
|---|---|---|
| WO | WO 98/28916 | 7/1998 |
| WO | 00/78043 | 12/2000 |
| WO | WO 00/78043 A1 | 12/2000 |
| WO | WO 00/79365 | 12/2000 |
| WO | WO 01/39506 | 5/2001 |
| WO | WO 02/17642 | 2/2002 |

OTHER PUBLICATIONS

CNET News, "Companies Want to Raise Boob Tube's IQ" *Article* (1996).

Steeplechase Media, Inc., "Steeplechase Media Develops Enhanced TV The Documentary Channel" *Press Release* (1998).

Intel, "MTV and Intel Create New Interactive Experience for Music Fans" *Article* (1997).

Intel, "Intel and PBS to Air First Nationwide Enhanced Digital TV Broadcast" *Article* (1998).

Li Q, et al. "XML Based Text TV" *Proceedings of the International Conference on Web Information Systems Engineering* XP002192977 (2000), pp. 109-113.

Shim, et al. "Template Based Synchronized Multimedia Integration Language Authorizing Tool", *Proceedings of the SPIE*, Bellingham, VA., vol. 3964, (2000), pp. 134-142.

International Search Report dated Jun. 2, 2004 for International application No. PCT/US03/10038, 9 sheets.

Hayashi et al. "TVML" (TV Program Making Language) Automatic TV Program Generation from Text-based Script. 1999, IEIC Technical Report, vol. 98, No. 552, 12 pgs.

International Search Report dated Apr. 11, 2003, for PCT/US02/35161, 3 pgs.

* cited by examiner

SYSTEM AND METHOD FOR COORDINATING INTERACTIVE TELEVISION PROGRAMS

CROSS REFERENCE TO RELATED APPLICATION

This application claims priority from Provisional Application No. 60/370,993, filed Apr. 9, 2002, which is incorporated herein by reference.

BACKGROUND OF THE INVENTION

According to current research, 40 million computer users in the United States have a television near their computers and use the two media synchronously. At the same time, a number of one-screen devices (such as 'set-top' boxes) that can combine computer and television functionality are becoming more prevalent.

A number of television companies have produced interactive television (ITV) applications utilizing a home computer for the interactivity and synchronizing the interactive content to the television broadcast. These include TBS (Friends and Dinner & A Movie), Comedy Central (Win Ben Stein's Money), Game Show Network (Greed), and ABC (Who Wants To Be a Millionaire). In addition, a smaller number of households have set top boxes (i.e., cable boxes) or net top boxes (e.g. AOLTV, UlitmateTV) that are capable of providing television overlays for ITV applications. A number of television companies have either provided ITV applications specifically for this platform, for example, CBS (CSI), or provided interactive television applications that can be accessed by both a home computer and a capable set top box or net top box (e.g., Friends, Greed).

Typical ITV applications produced to date have been produced after the television production was completed (in case of taped shows). The interactive content was written to complement the primary video content. Close synchronization of the interactive content with the primary video content to which it related was accomplished through coordination with personnel in the broadcast studio over the telephone. The producers of ITV applications controlled the synchronization from a remote location, and triggered each segment upon a cue from the broadcast operator.

Content can be delivered through one of several different techniques. In the case of a two-screen approach in which the screen for displaying the content is a computer, an open socket can be used whereby the interactive content is pushed to the end user. It is also known to provide additional content by encoding additional data with the television signal. This process is used, for example, with closed captioning. Another known method for providing content to users, such as users of a net-top box, is to provide a trigger to the end user device, which uses the trigger to retrieve content from a server.

To coordinate these different methods for providing content, the interactive content can be scheduled based on time codes in a program such that an item of content is provided, for example, at 10:30 after the start of a program.

Content or triggers can be embedded in a vertical blanking interval (VBI) and therefore dubbed on a copy of a master tape prior to broadcast. Requirements for testing and preparation mandate that a dubbed copy be sent to a broadcast studio several hours or days prior to broadcast. Often, however, last minute changes are desired, and it may be desirable to introduce real-time content (i.e., content created or selected while a program is being broadcast). Currently, such real-time content is typically introduced through manual efforts at a broadcast system to be incorporated into a broadcast signal.

SUMMARY OF THE INVENTION

The system and method described herein can provide close interaction between an interactive television system and a television broadcast system, and greater automation than prior content insertion systems. This interaction (i) more closely relates the interactive and primary video content, (ii) allows greater automation of the interactive television programming distribution, and (iii) allows real-time integration of interactive television results into the television broadcast.

The system relates to integration of the broadcast studio with the ITV system to provide automated: (1) synchronization of the interactive content to the television program (both one-screen and two-screen devices), (2) insertion of interactive content or triggers into the broadcast stream at the appropriate time as it is broadcast, and (3) display on the television screen of user feedback (e.g., poll results or competition results) from the interactive programming.

An embodiment of the present invention includes a system and method for synchronization of ITV programming with TV programming. Enhanced TV content (ITV content) can be either produced real-time or ahead of time and resides on an ITV server system. For synchronization of content across multiple platforms (e.g., two-screen, set-top, or wireless), the ITV server system should be in synchronization with the TV signal. Television studios use automation systems ('playlists') to automatically control the order and timing of various video streams. Information in an automation system (playlist) includes video stream identification, status, start time, and duration. An example of a playlist is provided in the incorporated provisional application.

The system and method described in the embodiment of the present invention use the playlist in the studio, which holds relevant synchronization information (e.g., segment and commercial break start and end times) to interface with the ITV system, enabling the ITV system to synchronize the interactive content with the television programming.

The embodiment of the present invention allows a more efficient production of ITV programming by automating the insertion of triggers during the television broadcast, and avoiding the need for incorporating the content or triggers into a dubbed copy of a master tape. Using conventional equipment already widely used in television studios to insert data onto broadcast tapes (such as encoder/inserter equipment sold by Norpak Corporation, located in Canada), the system allows insertion of ITV content during the broadcast, controlled from a remote location by the ITV system. Thus, the system allows for more convenient introduction of last minute changes to the content, as well as data related to unfolding events in a live program. The system can base the content/trigger imbedding timing on information retrieved from the automation system (playlist) as described above, and can thus synchronize two-screen devices (e.g., PC and TV side-by-side) and one-screen devices (e.g., set-top and net-top). Content is provided to two-screen systems via a server system, and to one-screen systems via timed real-time trigger insertion, with the content provided based on the same timing information from the automation system (the playlist).

The embodiment of the present invention provides a method to automatically display, on viewers's television screens, real-time data generated by an ITV program. This provides an advantage for ITV programming by completing a feedback loop of ITV content and TV programming. Showing the data generated by the ITV program to television viewers encourages participation in the interactive content, and makes the interactive content more compelling for the viewer. This viewer-driven ITV content can be incorporated in the TV programming in an automated manner using equipment in the broadcast facility. For example, after ITV participants are polled, the poll results can be sent to character generator (CG) equipment (e.g., equipment produced by Chyron Corporation or Pinnacle Systems) in the broadcast facility to automatically insert content into an on-screen graphic template for display to all television viewers. This process also applies to trivia questions and resulting scores and leader boards.

The system and method also enable the content provider to select, in advance, ITV content assets to be marked for on-air use. For example, in an interactive broadcast there might be 25 polls created, of which a subset will be integrated into the on-air broadcast. In addition to marking content for on-air use, the timing of the on-air display is coordinated such that the full process is completely automated.

A system according to the present invention includes some or all of the following components: (1) a broadcast system with character generation equipment (Character Generator), playlist information, and data insertion equipment, (2) an ITV server system, (3) an ITV coordination authority, (4) an ITV client device, and (5) a television. Some of the advantages of the present invention can be utilized without all of the components above. For example, a system according to the present invention that does not include a character generator can still provide synchronization and live trigger insertion.

The system described herein can (1) use information already in the television studio to automatically synchronize interactive programming with television programming, (2) permit last minute changes to the broadcast video by providing live trigger insertion controlled remotely by the ITV server system, (3) utilize character generators in the broadcast facility to display ITV programming results on viewers's television screens in real-time, and (4) provide coordination between the television broadcast and the ITV server system for multiple types of devices.

While a number of advantages have been identified herein, a system may fall within the scope of the present invention and yet not have all of the advantages described here. Other features and advantages will become apparent from the following description, drawings, and claims.

DESCRIPTION

The embodiment described here has a number of related functions, including: (1) synchronizing interactive content to a program, (2) enabling the insertion of interactive content or triggers at appropriate times during transmission, and (3) displaying user feedback from the interactive content on the television signal in an automated manner.

Figure 1:
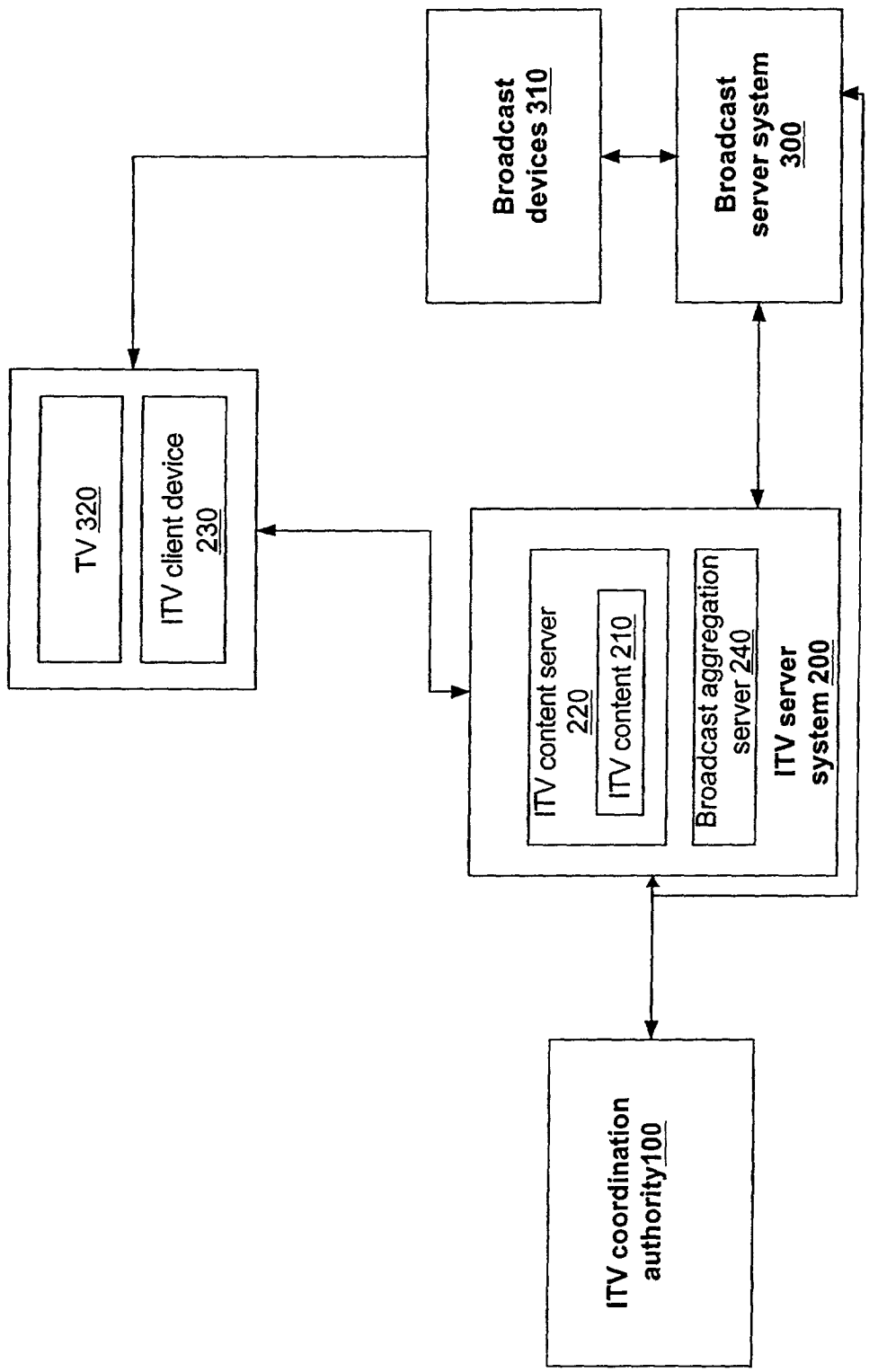
FIG. 1 is a block diagram of an ITV broadcast server that communicates with an ITV server system to coordinate activities between ITV and TV programming.

Referring to FIG. 1, the ITV coordination system includes an ITV coordination authority 100, an ITV server system 200, and a broadcast server system 300. The ITV coordination authority 100 is preferably implemented as a software program residing on a hardware device, such as a computer, for determining the ITV content sequence and display, and can include the technical director functionality described in the incorporated applications identified below. It can maintain the logic for content sequence and display, or it can be manually controlled to determine content sequence and display. The ITV coordination authority 100 can reside on any device connected via a communication network to the ITV server system 200 and broadcast server system 300. In most cases, the ITV coordination authority 100 uses a communication network, such as the Internet, to receive information from the broadcast server system 300 (which typically resides in a broadcast operating center) via a broadcast aggregation server 240 and uses a communication network to transmit synchronization information to the ITV server system 200. The ITV server system controls interactivity with ITV client devices 230.

A detailed example of a system for providing interactive content to multiple platforms and aspects thereof are described in a co-pending applications, Ser. No. 09/804,815, filed Mar. 13, 2001; Ser. No. 09/899,827, filed Jul. 6, 2001; Ser. No. 09/931,575, filed Aug. 16, 2001; Ser. No. 09/931,590, filed Aug. 16, 2001; and Ser. No. 60/293,152, filed May 23, 2001, each of which is assigned to the same assignee as the present invention, and each of which is incorporated herein by reference.

The ITV server system 200 has one or more hardware devices (such as servers, computers, processors, and/or other logic) with software programs running on these devices. The ITV server system 200, which can be distributed across multiple physical locations or reside in one location, is responsible for the serving and running of ITV programming. Examples of the type of location are a Network Operating Center or a head-end facility. The ITV server system 200 has an ITV content server 220 that holds the ITV content 210. ITV content server 220 communicates with ITV client devices 230 to provide/display ITV content 210.

The ITV client device 230 is a local device that can interpret ITV content 210 formatted specifically for the type of ITV client device 230 by the ITV content server 220. ITV client devices 230 can include personal computers, set-top boxes, net-top boxes, wireless computers, consoles, and hand held computers. In the case of set-top boxes and net-top boxes as ITV client devices 230, the display of this client device is usually a television. In case of a personal computer as the ITV client device 230, the ITV content 210 is usually displayed on a computer monitor.

The ITV content server 220 receives information from the ITV coordination authority 100, and based on this information, it presents ITV content 210 to the different ITV client devices 230. The ITV content server 220 can service these different types of ITV client devices at the same time, allowing for synchronization to broadcast experiences across multiple client devices in real-time.

The broadcast aggregation server 240 communicates with the broadcast server system 300 to exchange synchronization/timing information and character generator (CG) data. The broadcast server system 300 is responsible for the retrieval and delivery of ITV data to broadcast devices 310 and to the ITV server system 200 (in particular the broadcast aggregation server 240). The broadcast devices 310 are the source of the TV programming displayed by a television or other such device.

Figure 2:
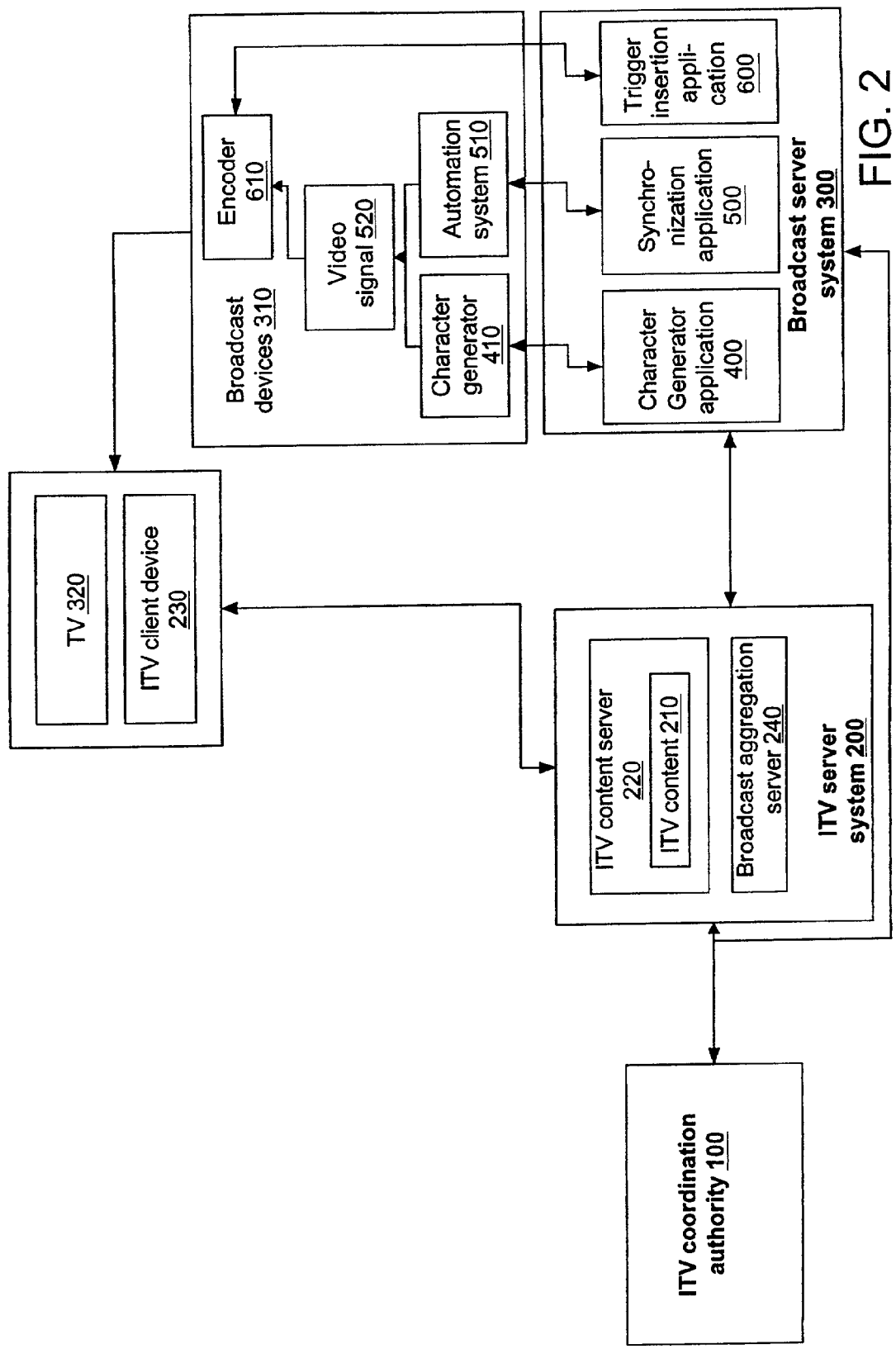
FIG. 2 shows a more detailed diagram of the different applications & hardware that make up an ITV coordination system.

Referring to FIG. 2, which illustrates in more detail different applications that make up the ITV coordination system, the broadcast server system 300 can have one or more hardware devices with several software programs interacting with broadcast devices 310 and the ITV server system 200.

A character generator (CG) application 400 communicates with a CG 410 to display ITV content 210 on-air. A character generator is a well-known device used to insert content, such as sports scores at the bottom of the television during a sports news broadcast.

A synchronization application 500 retrieves information such as start times and an identification (ID) of the events from a playlist automation system 510, and a trigger insertion application 600 communicates with an encoder 610 to provide triggers to the encoder. As will be discussed in more detail in the description of FIG. 6, in one embodiment, the ID and start time of an event passed on to the ITV coordination authority 100 by the synchronization application 500 are used by the ITV coordination authority 100 to generate a corresponding 'segment/event' trigger for the ITV server system 200. In this embodiment it is not necessary for the actual time to be passed on to the ITV server system 200, but the appropriate trigger (based on the event ID of the playlist information) will be send to the ITV server system 200 by the ITV coordination authority 100 based on the start-time of the event in the playlist automation system 510.

Figure 3:
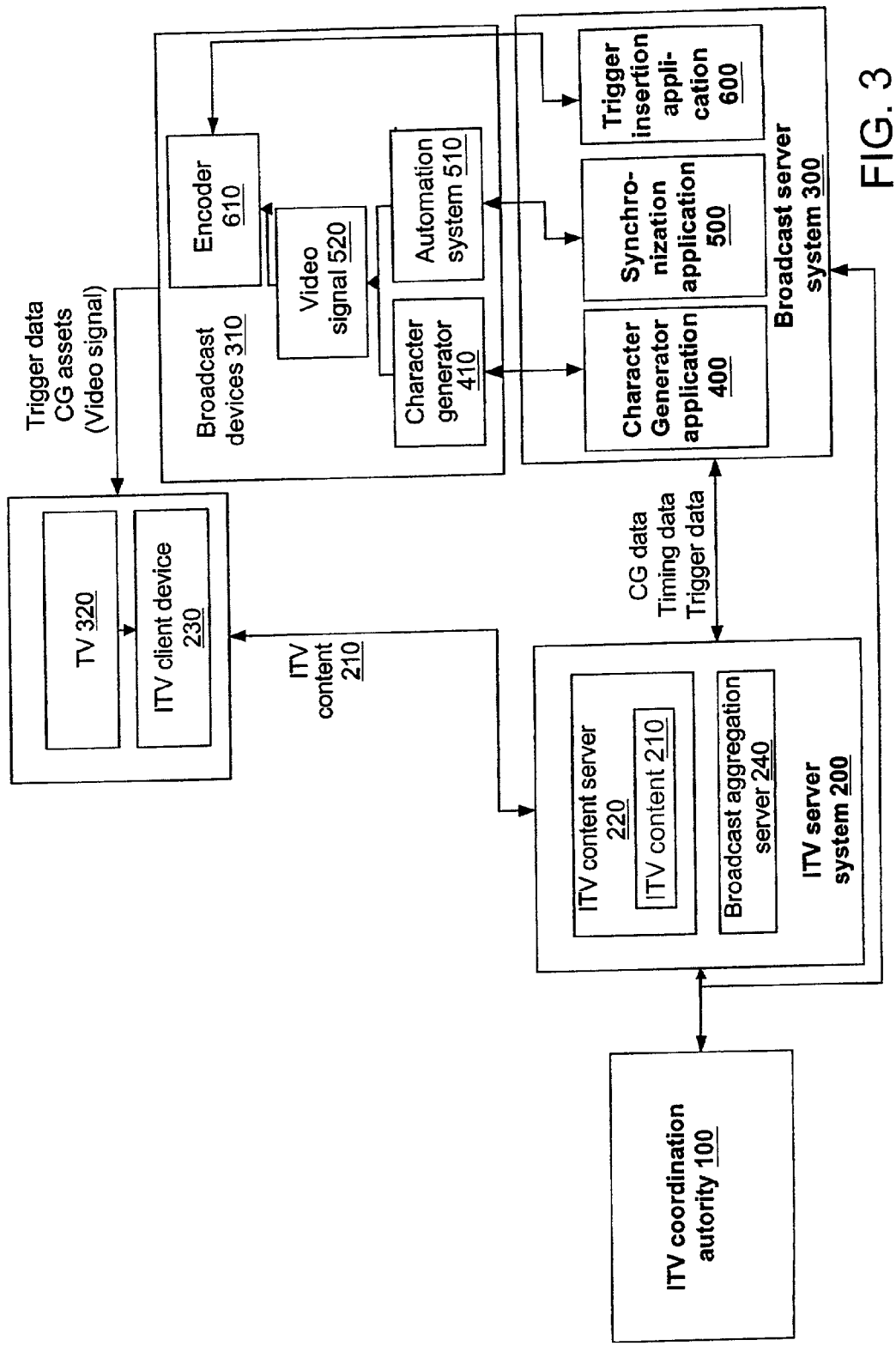
FIG. 3 shows the data flow in the ITV coordination system.

Referring now to FIG. 3, the character generator application 400 can interpret data from the ITV content server 220 and pass the ITV content 210 (CG data) to the CG device 410 for display as part of the TV program in a generally known manner.

The timing of the delivery of ITV content is driven by information from the playlist automation system 510, managed by the synchronization application 500 and logic provided by the ITV coordination authority 100. The ITV coordination authority 100 has a set of rules that can associate items in the playlist automation system 510 with synchronization triggers created by the ITV coordination authority 100. A rule can translate segment and show information present in the playlist automation system 510 into a segment trigger that can be read by the ITV server system 200. For example, "playlist information, segment: 2, show: Grammy" can be translated into a trigger identified as "segment=2&eventID=99." The ITV coordination authority 100 is responsible for sending this trigger at the start-time of the event dictated by the synchronization application 500.

In an alternative embodiment, the synchronization application 500 not only passes on the information from the playlist automation system 500, but also generates the appropriate data that can directly send to the ITV server system 200. In other words, in this alternative embodiment the synchronization application 500 fulfills also the role of the ITV coordination authority 100. The ITV content server 220 is responsive to these synchronization triggers from the ITV coordination authority 100 to push or make available ITV content 210 to the ITV client device 230.

The trigger insertion application 600 receives data from the ITV server system 200 based on the information that ITV server system 200 has received from the synchronization application 500. The trigger insertion application 600 then sends information to the encoder 610 for insertion of content into the video signal. This information can be delivered to the encoder 610 in many ways, depending on the capabilities of the encoder 610 or other connected devices. The result is that appropriate content and/or triggers are added to the video signal provided to end users. The content and triggers may be added to the signal in one of many different ways, depending on the operator's needs, including insertion in the vertical blanking interval, insertion in in-band frequencies, and insertion in out-of-band frequencies.

This system makes it more convenient to provide content on-the-fly or in real-time to systems that require triggers to pull content from another location. While it is generally known that a party at the broadcast devices can type in information to an encoder or character generator for transmission and display, the system described here allows a producer at a remote location to generate content, provide that content to the server, and through synchronization and interaction with a trigger insertion application 600, provide a trigger encoded with the broadcast signal to allow the user to retrieve the content from a server.

Synchronization application 500 thus synchronizes ITV server system 200, which in turn synchronizes ITV client devices 230 by sending content assets corresponding to the triggers inserted by the encoder 610 and driven by the trigger insertion application 600; This process allows different types of ITV devices 230 (e.g., set-top, net-top, PC (including MacOS ), and wireless) to share a synchronized, enhanced TV experience.

Figure 4:
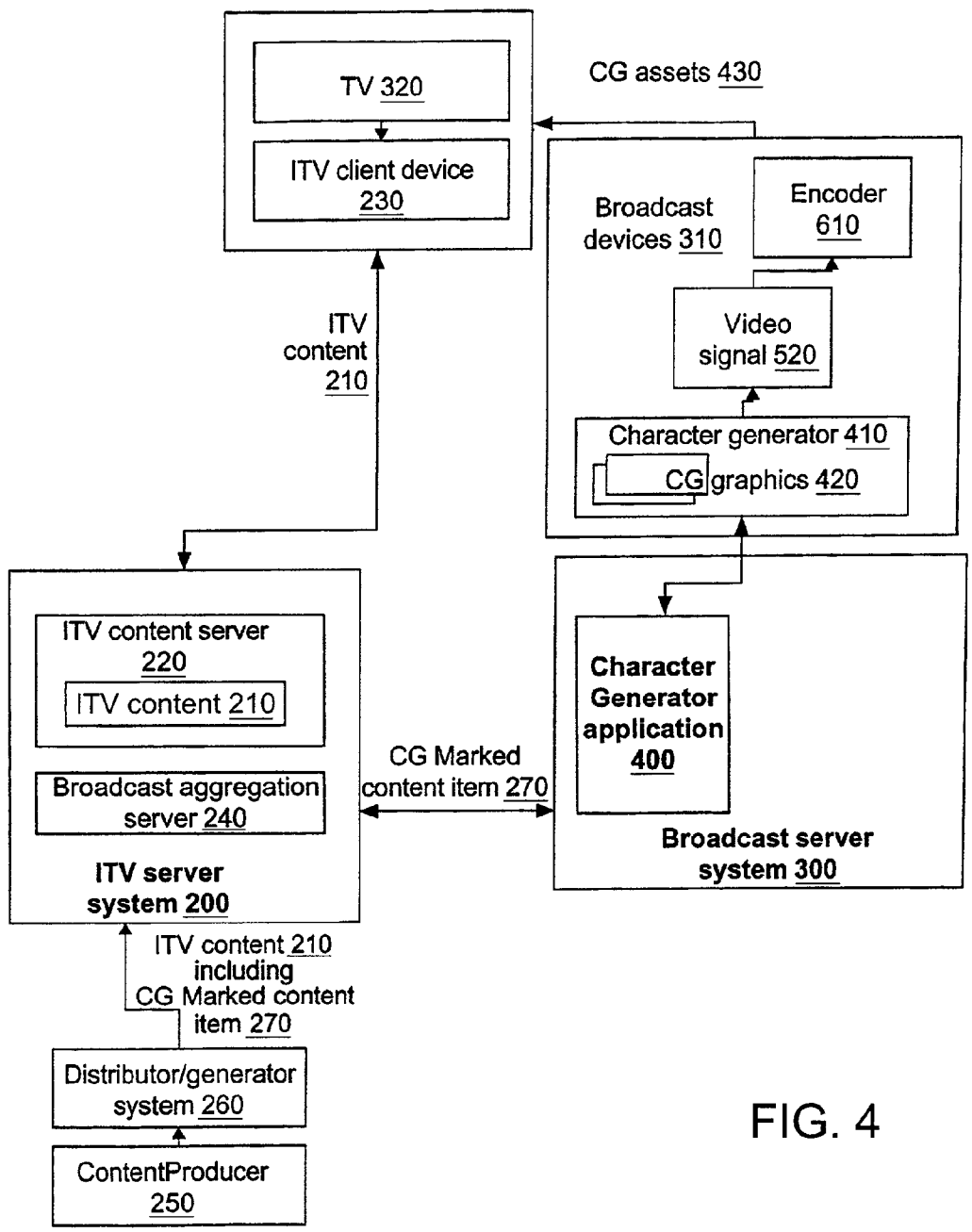
FIG. 4 shows a detailed diagram of a character generator application responsible for a feedback loop of ITV content to an on-air TV display.

FIG. 4 illustrates components of the system that provides the functionality to automatically insert ITV content into a broadcast program. A content producer 250 allows producers to generate items of content, such as polls, and to mark one or more of those items of content as a CG content item 270. The distributor/generator system 260 generates and distributes all content (including marked content) in an appropriate format to the ITV server system 200. An example of an appropriate format would be an XML node that would describe the content asset as well as mark whether or not it is supposed to go up on-air. An exemplary XML schema is set out in application Ser. No. 10/118,522, filed Apr. 8, 2002, which is incorporated herein by reference. As seen from the node below, the meta-item name is emdss, which stands for EventMatrix Data Subscription Service. The value equals onair1, which is the name of the appropriate CG graphics 420.

```
<leaderboard alias="Leaderboard 1 " title="Round 1 " text="Did you know that there are
thousands of people currently competing?" start-time="00:1 7:00" segment="3" on-the-fly="0"
duration="20" type="2" location="3" participants="10">
    <media title="Round 1 " location="" alt="" src="/images/round.gif" url="" credit=""/>
    <sponsor name="Milton">
        <sponsor-media title="Brought to you by Milton" location="" alt=""
src="/images/miltonlogo.gif" url="http://www.milton.com" credit=""/>
    </sponsor>
    <field name="Year" value="2002"/>
    <meta-data>
```

-continued

```
    <meta-item name="emdss" value="onair1 "/>
  </meta-data>
      </leaderboard>
```

When a poll or trivia question is provided to users, the users can respond to the poll or the trivia question, such as through a personal computer. The ITV server system can, in an automated manner, process the responses to produce processed content, such as the results of a poll, the percent of people getting the correct answer to a question, or a leader board of scores in a trivia contest. This processed content can then be provided to broadcast devices 310 through character generator 410 (or some other device for performing content insertion). Information can be included in the process content to identify the type of processed content it is, such as poll results or leader board. This information is provided to the character generator, which selects an appropriate graphic if a number of different graphics are used and displays this process data.

As an example, ITV content can be provided to individuals in the form of a poll during half time of a football game asking who they think will ultimately win the game. If marked as an item of content for on-air broadcast, the results can be tabulated and provided to a character generator with a template for how to present poll results. The character generator will insert, in the on-air broadcast, a graphic with text such as: "Of 29,734 responding to poll question asking who would win the game, 32% responded the Patriots." This system and method thus allows for an item of content that invites responses to be processed and incorporated automatically into an on-air broadcast for all viewers of the broadcast.

The processed content can be subject to automated checks and revision before being displayed, such as making sure names used for a party in a leader board is not an inappropriate name.

Referring to FIG. 4, once the ITV server system 200 executes the CG marked content item 270 (based on timing information from the synchronization application 500), this item will be sent to the CG application 400. This application will interpret the data and pass it to the CG graphics 420 that reside on the CG 410. In addition to the CG marked content item 270, the CG application 400 can pass information describing the format, behavior, and presentation for the CG marked content to be displayed on CG 410. The data from the CG application 400 targeted to a specific CG graphic 420 will generate the CG assets 430 that will be part of the TV programming transmitted for display on TV 320.

Figure 5:
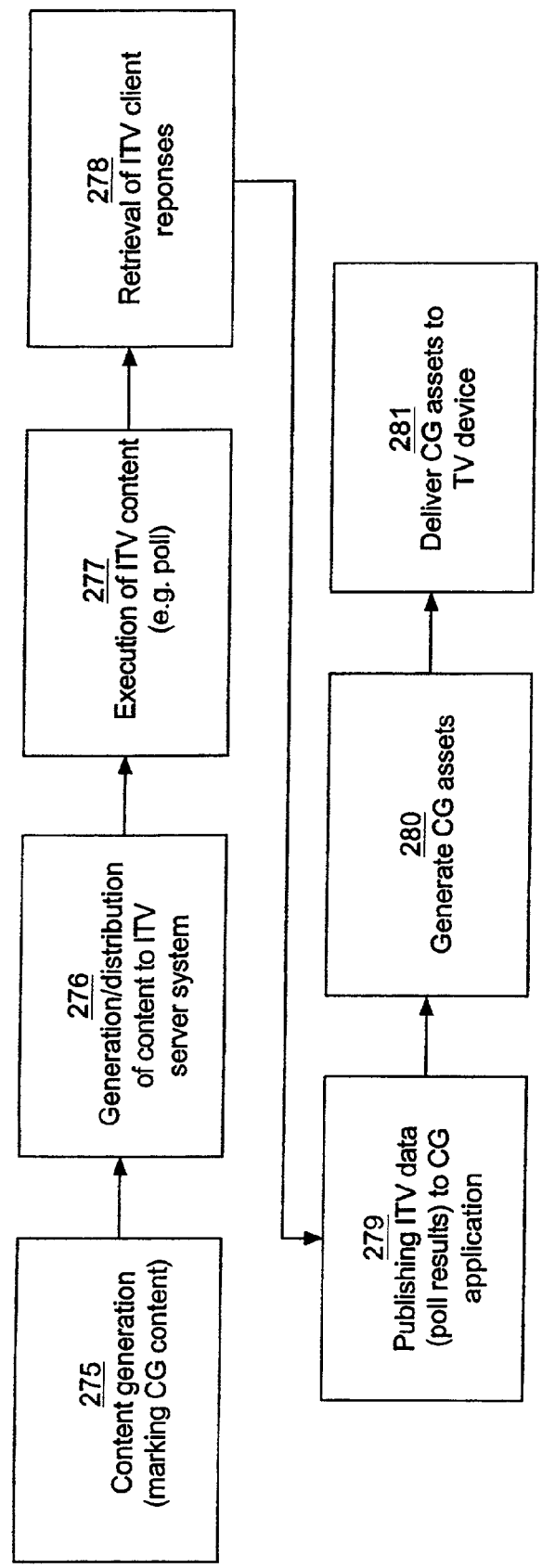
FIG. 5 shows the flow of the acts used for content to go from generation to an on-air asset.

Referring now to FIG. 5, content generation step 275 generates content using the content producer 250. The content items that are designated to go up on-air as part of the TV program are marked (CG marked content item 270). The CG graphics 420 are specified with the content to determine in which CG templates the content item 270 has to be displayed. Step 276 generates and distributes the files to the ITV server system 200 to run the ITV program. These files will include the CG marked content item 270. In step 277, the ITV server system 200 executes a CG marked content item 270, such as an interactive poll, triggered by synchronization information from synchronization application 500. In step 278, the ITV clients 230 submit poll results to the ITV server system, which aggregates the poll results as described in the incorporated co-pending applications. Step 279 publishes the CG marked content item 270 (poll results in this case) to the CG application 400. In step 280 the CG application 400 formats this data and submits it to the identified CG graphics 420, which uses the data to populate the relevant regions within the graphics to generate the CG assets 430. In step 281, the broadcast system delivers the CG assets 430 to the TV device 320 as part of the broadcast signal.

Figure 6:
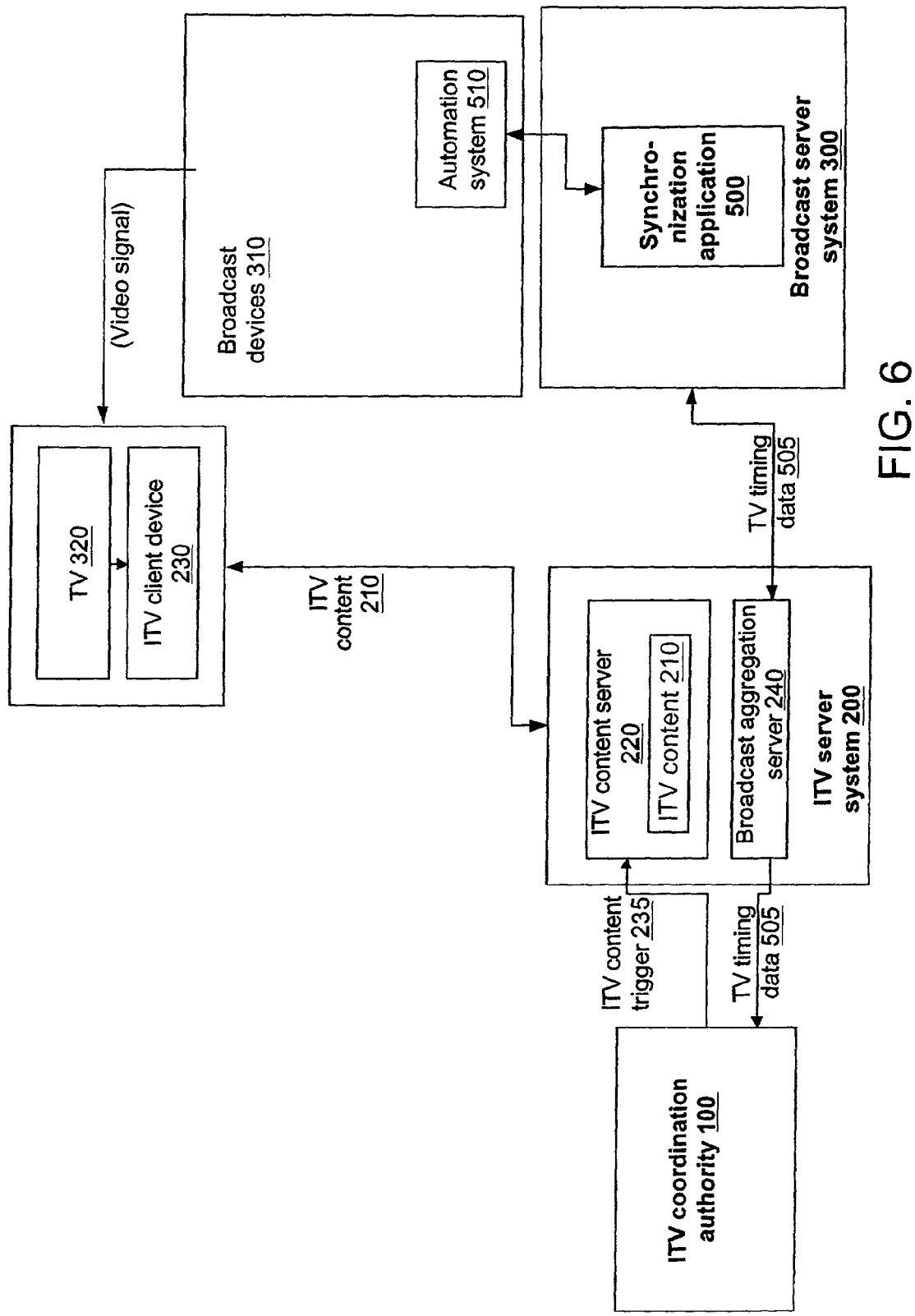
FIG. 6 shows a detailed diagram of the synchronization application responsible for the synchronization of ITV and TV content.

FIG. 6 illustrates the synchronization of ITV and TV programming using the synchronization application 500. The synchronization application 500 retrieves timing information from the automation system 510 (playlist) and passes this TV timing data 505 to the broadcast aggregation server 240. The broadcast aggregation server 240 passes this TV timing data 505 to the ITV coordination authority 100. The ITV coordination authority 100 has logic to generate appropriate ITV content trigger 235 for the appropriate ITV content server 220. This ITV content trigger 235 initiates display of ITV content 210 by the ITV content server 220. In an example of this system, the synchronization application 500 retrieves the start-time and ID of a playlist event (e.g., start of a segment—coming out of a commercial break) from the playlist automation system 500. The ITV coordination authority 100 receives this information (ID and start-time) and translates this into an ITV content trigger 235 for the ITV server system 200. The ITV coordination authority 100 then sends the ITV content trigger 235 at the start-time of the segment as retrieved from the synchronization application 500. The ITV trigger 235 could initiate the display of an individual content item 210 or a group of content items (e.g., all content items for this segment until the next commercial break). The display of each of the items within a group could then be based on relative timing kept internally by the ITV content server 220. Alternatively, synchronization application 500 can directly communicate with the trigger insertion application 600 (FIG. 3) and the ITV content server 220 and generate the ITV content trigger 235 and ITV data 615.

Figure 7:
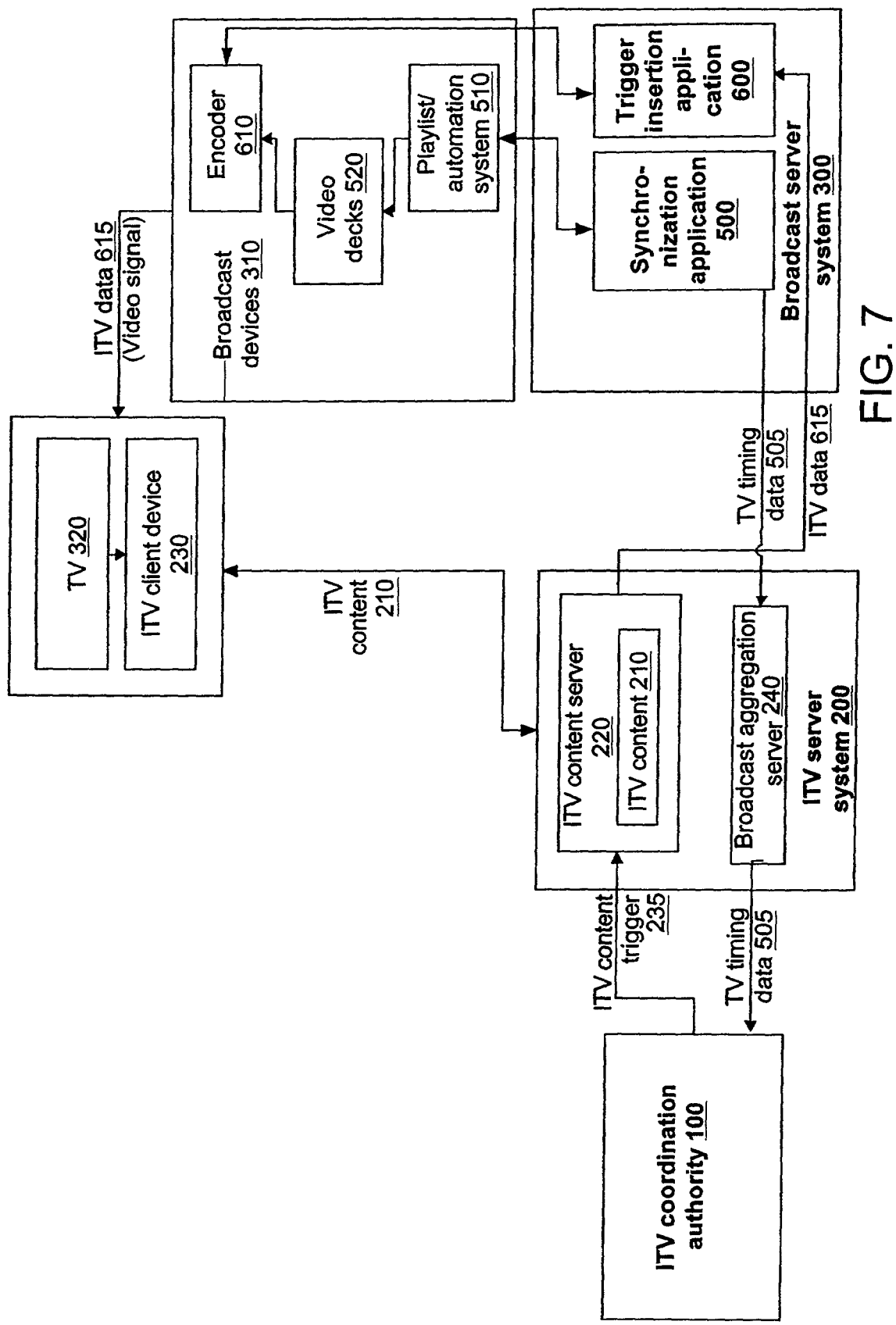
FIG. 7 shows a detailed diagram of the trigger insertion application responsible for the coordination of interactivity between one-screen and two-screen ITV client devices.

Referring to FIG. 7, the synchronization of ITV content on different ITV client devices 230 might require sending ITV data 615 to ITV client device 230 (for example in case of lower-end set-top boxes). Other ITV client devices 230 can interpret pushed ITV content 210 from the ITV content server 220 and do not need the ITV data 615 to retrieve their timed ITV content 210. The timing data 505 transformed into ITV content trigger 235 by the ITV coordination authority 100 is sufficient to synchronize ITV content with the TV programming for those devices that can accept pushed content from the server. For ITV client devices 230 that can only retrieve (pull) ITV content 210 but cannot listen for ITV content that might be available, the ITV data 615 initiates the retrieval of the ITV content 210 from the ITV content server 220. The ITV content server 220 actually sends the ITV data 615 (based on ITV content trigger 235) to the trigger insertion application 600. The trigger insertion application 600 then communicates with the encoder 610 (one of the broadcast devices 310) to incorporate these ITV data 615 into the video signal so the ITV client device can initiate retrieval of the available ITV content 210. An advantage of the system and method described here is that the timing of ITV content 210 can not only be determined in real-time, but the content item itself can be generated in real-time. This ability makes the system and method of the present invention well suited for real-time enhanced ITV content production for multiple types of end user devices. The ITV coordination authority 100 can be used to produce real-time content. The ITV content server 200 can then push that content, as well as generate the appropriate trigger, to imbed ITV data 615 using the trigger insertion application 600 in a real-time manner.

While a particular embodiment is described herein, it should be understood that modifications can be made without departing from the scope of the invention as defined by the claims. For example, while it has been described that the trigger insertion application receives data from the ITV server system based on information that the ITV server system receives from the synchronization application, the trigger insertion application can receive instructions directly from the synchronization application.

What is claimed is:

1. A system for synchronizing enhanced content with a broadcast signal provided from a broadcast system that has the ability to insert content or triggers into the broadcast signal, and has a playlist with broadcast event and timing information, the system comprising:
   a synchronization application receiving timing information from the playlist and using that timing information to generate synchronization triggers, the synchronization application residing in a device other than a first end user device;
   a content server configured to receive the synchronization trigger from the synchronization application and push content to the first end user device over a channel separate from the broadcast signal; and
   a trigger insertion application configured to receive the synchronization trigger from the synchronization application for causing the broadcast system to insert a content trigger that allows a second end user device to pull the enhanced content from the server using the content trigger.

2. The system of claim 1, wherein the broadcast system includes a character generator, the content server creating content and providing the content to the character generator in an automated manner for insertion into the broadcast signal.

3. The system of claim 1, wherein the broadcast system includes an encoder, wherein the trigger insertion application provides the content trigger to the encoder for insertion.

4. The system of claim 1, further comprising a remote content authority for creating content, the content authority receiving trigger information from the synchronization application and providing trigger information to the trigger insertion application.

5. The system of claim 1, wherein the synchronization application provides trigger information directly to the trigger insertion application.

6. The system of claim 1, wherein the device hosting the synchronization application is a coordination system coupled to the content server for coordinating delivery of the enhanced content.

7. A method for synchronizing enhanced content with a broadcast signal provided from a broadcast system, the method comprising:
   receiving timing information from a playlist and using the timing information to generate an ITV content trigger;
   providing the ITV content trigger to a content server by a device other than a first or second type of end user device; and
   using the ITV content trigger to concurrently push and pull enhanced content corresponding to the ITV content trigger, wherein the pushing is conducted by a content server for pushing the enhanced content to the first type of end user device, and the pulling is conducted by the second type of end user device for pulling the enhanced content from the content server.

* * * * *

UNITED STATES PATENT AND TRADEMARK OFFICE
CERTIFICATE OF CORRECTION

| | | |
|---|---|---|
| PATENT NO. | : 8,555,313 B2 | Page 1 of 1 |
| APPLICATION NO. | : 10/142756 | |
| DATED | : October 8, 2013 | |
| INVENTOR(S) | : Newnam et al. | |

It is certified that error appears in the above-identified patent and that said Letters Patent is hereby corrected as shown below:

In the Drawings:

In Fig. 3, Sheet 3 of 7, in Box "100", in Line 2, delete "autority" and insert -- authority --, therefor.

In Fig. 5, Sheet 5 of 7, in Box "278", in Line 2, delete "reponses" and insert -- responses --, therefor.

In the Specifications:

In Column 5, Line 53, delete "system 500," and insert -- system 510, --, therefor.

In Column 6, Line 36, delete "600;" and insert -- 600. --, therefor.

In Column 8, Line 26, delete "system 500." and insert -- system 510. --, therefor.

In Column 9, Lines 1-2, delete "server 200" and insert -- server 220 --, therefor.

Signed and Sealed this
Twenty-eighth Day of January, 2014

Michelle K. Lee
*Deputy Director of the United States Patent and Trademark Office*